(No Model.)

M. D. BOWEN.
NUT LOCK.

No. 533,206.  Patented Jan. 29, 1895.

Witnesses
W. T. Norton
S. E. Zimmerman

Inventor
Miles D. Bowen
By F. L. Chowen
his Attorney.

UNITED STATES PATENT OFFICE.

MILES D. BOWEN, OF WILMINGTON, DELAWARE.

NUT-LOCK.

SPECIFICATION forming part of Letters Patent No. 533,206, dated January 29, 1895.

Application filed September 14, 1894. Serial No. 523,000. (No model.)

*To all whom it may concern:*

Be it known that I, MILES D. BOWEN, a citizen of the United States, residing at Wilmington, in the county of New Castle and State of Delaware, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to nut locks of that type, wherein the nut is held from loosening by the engaging of a pivoted dog on the threads of the bolt. In all such nut locks so far as I am aware, the engagement of the dog and threads is maintained by the action of a spring which in practice militates against the efficiency of the lock in that the springs, besides adding to the cost of the device, will in a short time become weak or broken, and rendered unfit for use. Aside from this objection, the engaging edge of the dog has invariably been formed with comparatively sharp teeth which engage in practice the base of the threads and consequently any wear on said teeth or the threads renders the lock useless.

By my invention I have produced a nut lock which is devoid of springs, and which has a provision for taking up the wear on the dog or threads, and in other respects will operate with increased efficiency.

The nature of my invention will appear from a reading of the subjoined description, when taken in connection with the accompanying drawings which form a part of this specification, and in which—

Figure 1:
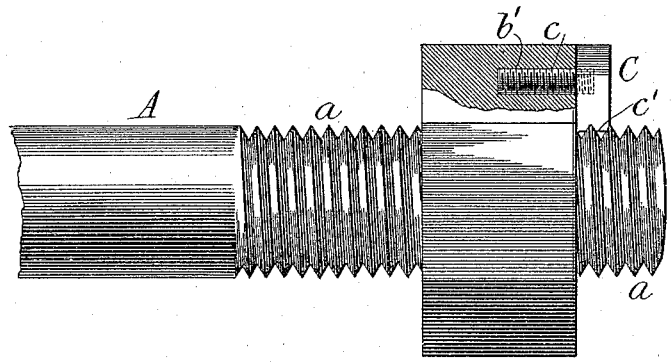
Figure 2:
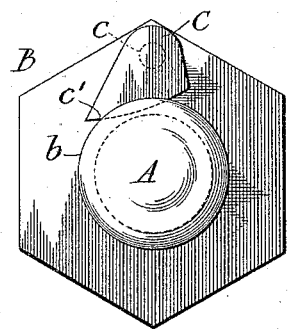
Figure 4:
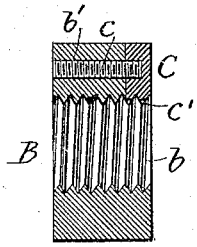
Figure 3:
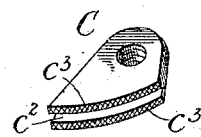

Figure 1 is a side elevation of my improved nut lock; Fig. 2, a front elevation of the same; and Fig. 3 is a perspective view of the locking dog. Fig. 4 is a vertical section of the nut showing a modified arrangement of the locking dog.

Referring to said drawings by letter, A denotes the bolt having the external threads $a$, and B is the nut having the usual central threaded aperture $b$ for the bolt.

The locking device consists of a dog C pivotally secured to the outer side of the nut by a threaded pin $c$ entering an aperture $b'$ in said nut. The pin preferably extends only partly through the dog as shown, to which it is first secured, and the pin is then inserted in the aperture by rotating it and the dog until the inner side of the dog lies against the outer face of the nut. The dog in practice requires but a slight movement and this is allowed for by making the aperture slightly deeper than the length of the pin. The engaging edge $c'$ of the dog is of a peculiar shape, being curved in a line whose radius gradually increases in length from right to left after the nature of a cam, and thus the weight of the sides of the dog are unequal and tend to maintain a contact between the dog and the threads on the bolt. The engaging edge of the dog is provided with a shallow groove $c^2$ which divides the edge into two blunt teeth $c^3$ $c^3$ which are finely serrated to insure a positive engagement with the side of the thread. As shown in Fig. 1, these teeth extend only a short distance into the threads, the engagement being on the sides of the thread instead of at the bases thereof as heretofore, and this arrangement aided by the increasing radius of the engaging edge enables the wear either on the dog or threads, or both, to be compensated, thus prolonging the life of the nut lock. The peculiar shape and nature also of said edge insures a positive engagement between the dog and threads when the nut has a tendency to loosen, and the nut is consequently tightly locked, and can only be taken off by moving the dog by hand.

If desired, the outer side of the nut may be cut away to accommodate the dog, in order that the latter may lie flush with said outer side, but in such a case the pin extends entirely through the dog and is screwed through the same into the aperture, or into the latter through the nut. The dog may also be made reversible in order that the same may be used with right or left threaded bolts.

The nut lock is very simple both in construction and operation, may be applied to existing nuts, and the provision for compensating for wear renders the nut lock capable of being repeatedly used.

I claim as my invention—

A nut lock comprising in combination, a bolt, a nut, a dog pivotally secured to said nut and having a curved engaging edge whose radius increases from left to right, said edge having a shallow groove dividing the same into blunt teeth which engage the sides of the threads, said teeth being serrated, all as and for the purpose set forth.

In testimony whereof I affix my signature in presence of two witnesses.

MILES D. BOWEN.

Witnesses:
J. JACKSON PEIRCE,
W. H. THOMAS.